United States Patent [19]

Funakubo et al.

[11] Patent Number: 5,124,997
[45] Date of Patent: Jun. 23, 1992

[54] TURBO BLOWER FOR A LASER DEVICE AND A LASER OSCILLATOR DEVICE

[75] Inventors: Tsutomu Funakubo, Fujiyoshida; Norio Karube, Machida, both of Japan

[73] Assignee: Fanuc Ltd., Minamitsuru, Japan

[21] Appl. No.: 582,206

[22] PCT Filed: Feb. 9, 1990

[86] PCT No.: PCT/JP90/00170

§ 371 Date: Oct. 1, 1990

§ 102(e) Date: Oct. 1, 1990

[87] PCT Pub. No.: WO90/10328

PCT Pub. Date: Sep. 7, 1990

[30] Foreign Application Priority Data

Feb. 23, 1989 [JP] Japan .................................. 1-44223

[51] Int. Cl.$^5$ .................................................. H01S 3/22
[52] U.S. Cl. ........................................... 372/58; 372/59; 372/61; 372/55; 372/34
[58] Field of Search ................ 372/58, 59, 55, 61, 372/34; 416/95, 184, 204 A

[56] References Cited

U.S. PATENT DOCUMENTS 4,984,245  1/1991  Karube ................................. 372/59
5,022,039  6/1991  Karube et al. ....................... 372/58

FOREIGN PATENT DOCUMENTS 0030387  2/1987  Japan ................................. 372/59

Primary Examiner—Georgia Y. Epps
Attorney, Agent, or Firm—Staas & Halsey

[57] ABSTRACT

A turbo blower for a laser device, including a shaft having an impeller on one end thereof, a pair of bearings, having inside grease spaces and supporting the shaft Non-contact seal portions are provided for preventing an outflow of grease, whereby other spaces for retaining the grease are formed on either side of the bearings. Although the grease in the inside spaces of the bearings is urged to escape from the bearings by the centrifugal force of the rotation of the shaft, the grease is prevented from flowing out of the spaces on either side of the bearing by the non-contact seal portions.

21 Claims, 4 Drawing Sheets

TURBO BLOWER FOR A LASER DEVICE AND A LASER OSCILLATOR DEVICE

BACKGROUND OF THE INVENTION

1. Technical Field

The present invention relates to a turbo blower for a laser device for forcibly circulating a laser gas in a gas laser device used for machining and the like and a laser oscillator device, and more particularly, to a turbo blower for a laser device and a laser oscillator device, in which the life of bearings therein is lengthened to improve the reliability and maintenance efficiency of the device.

2. Background Art

Modern carbon dioxide ($CO_2$) gas laser oscillator devices provide high output and high-quality laser beams, and are now widely used for laser beam machining, such as the cutting of metallic or nonmetallic materials and the welding of metallic materials or the like. The development of these devices has been rapid, especially of CNC (numerical control device) laser machining devices combined with a CNC, in the field of a high-speed, high-accuracy cutting of intricate configurations.

A conventional carbon dioxide ($CO_2$) gas laser oscillator device will now be described with reference to the drawings.

FIG. 4 is a diagram showing the general arrangement of the prior art carbon dioxide ($CO_2$) gas laser device. As shown in the Figure, an optical resonator composed of an output coupling mirror 2 and a total reflection mirror 3 is disposed at either end of a discharge tube 1, and metal electrodes 4 and 5 are mounted on the outer periphery of the discharge tube 1. The metal electrode 4 is grounded, while the metal electrode 5 is connected to a high-frequency power supply 6, and a high-frequency voltage from the high-frequency power supply 6 is applied between the metal electrodes 4 and 5, whereby a high-frequency glow discharge occurs in the discharge tube 1 and a laser excitation is effected. Numerals 13 and 14 denote a laser beam axis in the discharge tube 1, and a laser beam axis taken out from the output coupling mirror 2, respectively.

When starting a gas laser oscillator device constructed in this manner, gas in the whole apparatus is first exhausted by a vacuum pump 12 and, then a valve 11 is opened to allow a predetermined amount of laser gas to be introduced from a gas cylinder 10 until the gas pressure in the apparatus reaches a specified value. Thereafter, the exhausting by the vacuum pump 12 and the resupply of gas by the valve 11 are continued, whereby part of the laser gas is continually replaced with fresh gas while the gas pressure in the apparatus is kept at the specified value, and thus gas pollution in the device can be prevented.

As shown in FIG. 4, the laser gas is circulated in the apparatus by a blower 9, for cooling the laser gas. In the carbon dioxide ($CO_2$) gas laser, about 20% of the injected electrical energy is converted into a laser beam, and the remainder is used for heating the gas. Theoretically, however, the laser oscillation gain is proportional to the minus (3/2)th power of the absolute temperature T, and thus the laser gas must be forcibly cooled in order to raise the oscillation efficiency. In the shown device, the laser gas flows through the discharge tube 1 in the direction indicated by the arrows, at a flow rate of about 100 m/sec, and is introduced into the cooling unit 8, to remove heat, mainly attributable to the electric discharge, from the laser gas. The blower 9 compresses the cooled laser gas, and the compressed laser gas is passed through a cooling unit 7 before being fed into the discharge tube 1. This is necessary in order to remove compression heat produced in the blower 9, by the cooling unit 7, before the gas is again fed into the discharge tube 1. These cooling units 7 and 8 are well known in the art, and thus a detailed description thereof is omitted.

FIG. 5 shows the construction of a turbo blower used as the blower 9. As shown in the Figure, an impeller 16 and a shaft 26 are mechanically connected, and a rotor 17 is mounted on the shaft 26. The rotor 17 and a stator 18 constitute a motor by which the impeller 16 is rotated at a high speed of about 100,000 rpm. In contrast with a low-speed rotation Roots blower, therefore, the reduction of the volume is inversely proportional to the rotational frequency. Further, rolling-contact bearings 19 and 20 are used for supporting the shaft 26, and since the turbo blower rotates at high speed, the rolling-contact bearings 19 and 20 are lubricated by an oil-jet or oil-air lubrication method in such a manner that oil is supplied to the bearings at predetermined intervals.

In an oil supply unit 21 shown in FIG. 5, the oil is atomized by gas and supplied to the rolling-contact bearings 19 and 20 through passages 22 and 23.

With this arrangement, the laser gas is sucked from the cooling unit 8 into the turbo blower, as indicated by an arrow 81, and is discharged from the turbo blower into the cooling unit 7, as indicated by an arrow 71.

The conventional laser oscillator device shown in FIGS. 4 and 5 has the following problems.

First, since oil is used as a lubricant, oil components are mixed with the laser gas, and accordingly, optical parts are polluted and an output drop or mode transformation occurs. In a high-output carbon dioxide ($CO_2$) gas laser, therefore, the laser gas is continually replaced, which accounts for a large part of the running cost. Nevertheless, the optical parts still must be periodically replaced or cleaned, and thus the maintenance work is labor-consuming.

Second, if too much oil is supplied, the efficiency of the bearings may be lowered due to disturbances in the flow of the oil in the bearings, and further, the temperature thereof is affected. Accordingly, the oil supply unit requires intensive control, which entails a substantial increase in costs.

Third, the bore of the oil passage is very small, and therefore, is easily blocked by clogging, whereby it becomes impossible to supply oil to the bearings, resulting in bearing seizure.

Accordingly, the present inventors previously filed an application (Japanese Patent Application No. 63-148918) in which a grease lubrication method was proposed, to prevent pollution of the laser gas by oil mist. The use of grease for the lubrication ensures that only an irreducible minimum amount of oil escapes, and therefore, optical parts and the like are not polluted by oil. Accordingly, the laser output and beam characteristics will not be deteriorated, and only a predetermined amount of grease need be sealed in the bearings at the time of the assembling thereof. Accordingly, the need for a continual supply of lubricant, and maintenance work, such as oiling, becomes unnecessary.

If the turbo blower is rotated at a high speed (e.g., a DmN value of 800,000 or more), however, the grease is expelled and forced out of the bearings by the centrifugal force created by the rotation of the inner race, retainer, and rolling members thereof, since the amount of grease sealed therein accounts for 30% to 50% of the space inside the bearings. Accordingly, the amount of grease retained between the rolling-contact surface of the inner or outer race and the rolling members is greatly reduced and cannot withstand a prolonged operation, and thus the grease must be periodically replaced or resupplied. During this replacement or resupply, the laser oscillator device must be stopped to allow the turbo blower to be removed and disassembled.

Moreover, when the amount of grease retained becomes too small, the fatigue life of the bearings is shortened due to an increased friction between the rolling-contact surfaces attributable to insufficient lubrication, which friction produces heat, and thus the bearings themselves must be replaced.

In the grease lubrication method, therefore, the amount of grease sealed therein must be strictly controlled. If this is not done, the grease cannot produce the intended lubrication effect, and further, the above problems arise.

SUMMARY OF THE INVENTION

The present invention has been created in consideration of the above-described circumstances, and an object thereof is to provide a turbo blower for a laser device and a laser oscillator device, in which reduction of the grease for lubrication sealed between the rolling-contact surfaces of an inner or outer race and the rolling members can be prevented, and the service life of the bearings can be lengthened without periodically resupplying or replacing the grease.

To solve the above problem, according to the present invention, there is provided a turbo blower for a laser device including a shaft having an impeller mounted on an extreme end thereof, a pair of bearings supporting the shaft, and a motor for rotating the shaft, wherein first spaces for retaining grease are formed on either side of the bearings, non-contact seal portions are provided for preventing the grease from flowing out of the spaces, and the first spaces and the second inside spaces of the bearings are filled with the grease.

According to the present invention, moreover, there is provided a laser oscillator device using the turbo blower described above.

The first spaces for grease retention are formed on either side of the bearings, the non-contact seal portions are provided for preventing the grease from flowing out of the spaces, and these first spaces and the second inside spaces of the bearings are filled with the grease. In this case, the second inside spaces are approximately packed full with the grease. An inner race, a retainer, and rolling members, etc. rotate as the shaft rotates, and the grease in the bearings is urged away from the bearings by the centrifugal force of the rotation. Nevertheless, the grease is prevented from flowing out of the second inside spaces by the non-contact seal portions on either side of the bearings, and thus the amount of grease held between the rolling-contact surfaces of the inner and outer races and the rolling members is not reduced.

DESCRIPTION OF THE PREFERRED EMBODIMENTS

Embodiments of the present invention will now be described with reference to the drawings.

Figure 1:
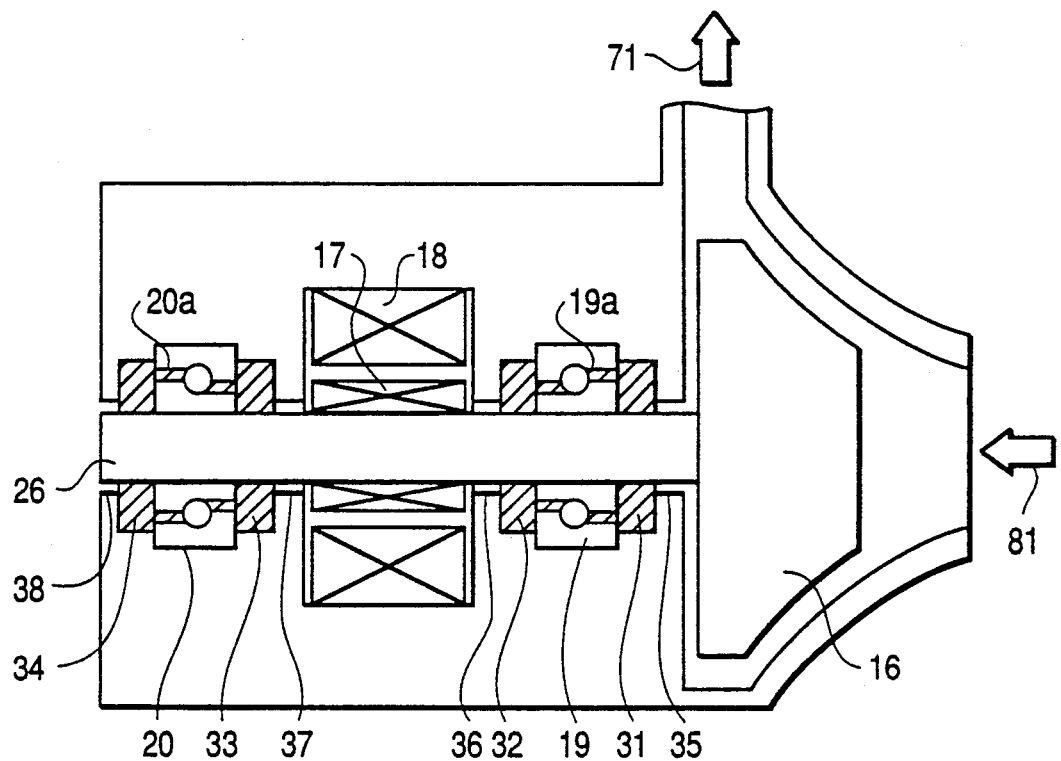
FIG. 1 is a side, partial cross-sectional view showing the construction of a turbo blower for a laser device with a laser output of about 1 kW, according to one embodiment of the present invention.
Figure 5:
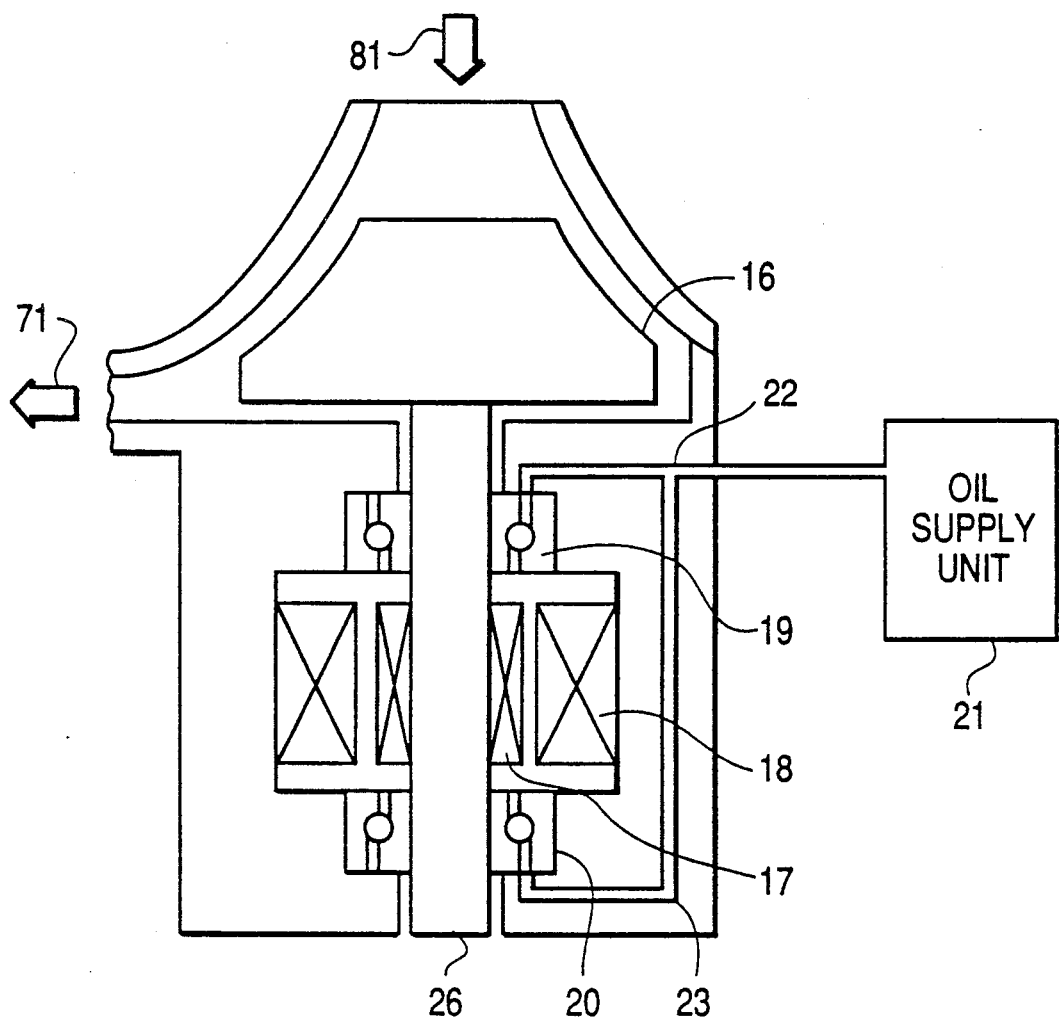
FIG. 5 is a side, partial cross-sectional view showing the arrangement of a conventional turbo blower for a laser device.

FIG. 1 is a diagram showing the construction of a turbo blower for a laser device with a laser output of about 1 kW, according to one embodiment of the present invention. Note, like numerals refer to like components in FIGS. 1 and 5, and therefore, a description of those components is omitted. Although a centrifugal impeller is illustrated as an impeller 16 in this case, it may be replaced with a mixed-flow impeller or axial-flow impeller.

The arrangement of the present embodiment differs essentially from the conventional turbine in that non-contact seal portions 35, 36, 37 and 38 for preventing a run-off of grease are arranged on either side of rolling-contact bearings 19 and 20, and that second spaces 31, 32, 33 and 34 for grease retention are defined by these non-contact seal portions. These spaces and first inside spaces of the bearings 19a and 20a, respectively are approximately packed full with the grease. The non-contact seal portions 35, 36, 37 and 38, which utilize the high-speed rotation of a shaft 26, function with a non-contact gap of about 0.2 mm, and the grease used may be a lithium grease or sodium grease. With this arrangement, the inside spaces 19a, 20a of the bearings are always filled with the grease. In the present embodiment, moreover, the axis of rotation of the shaft 26 extends in parallel to the ground, i.e., the turbo blower is installed horizontally, and thus the grease is efficiently collected in the spaces 31, 32, 33 and 34.

The service life of a turbo blower having a conventional construction ranges from 500 to 1,000 hours. According to the turbo blower of the present embodiment, however, a service life of 5,000 to 15,000 hours can be obtained. Also, a resupply or replacement of the grease, which is conventionally performed at regular intervals, is not required, and thus the reliability and maintenance efficiency of the turbo blower are greatly improved.

Figure 2:
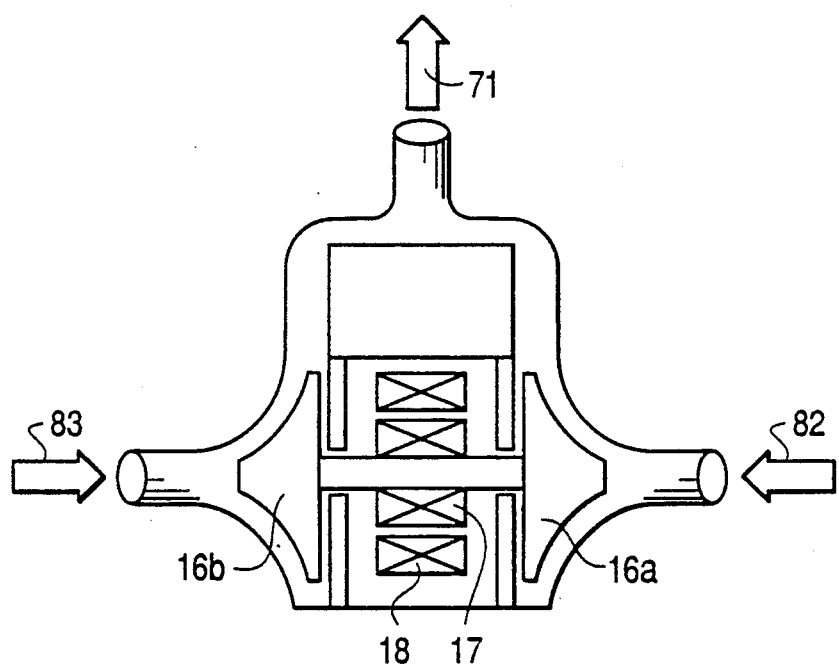
FIG. 2 is a side, partial cross-sectional view showing the construction of a turbo blower for a laser device with a laser output of about 2 kW, according to another embodiment of the present invention.

The turbo blower of FIG. 1, which is applied to a laser oscillator device with an output of about 1 kW, may use a large-sized impeller to obtain a higher output. From the viewpoint of cost, however, it is advisable to use the same impeller. FIG. 2 shows a turbo blower for a laser device with an output of about 2 kW. In this drawing, the bearings of the turbo blower, which are identical to those shown in FIG. 1, are omitted. In FIG. 2, arrows 82 and 83 indicate directions in which a laser gas flows from a cooling unit 8 to the turbo blower.

Two impellers 16a and 16b are attached to the right and left ends, respectively, of a shaft, and in this arrangement, the two impellers 16a and 16b can be rotated by bearings and a drive motor as one set, so that the cost performance is high. The motor is composed of a rotor 17 and a stator 18. In this case, the impellers are mounted on the same shaft, so that fluctuations of load in the thrust direction cancel one another, the thrust load becomes very small, the stability is improved, and the service life is considerably lengthened.

Figure 3:
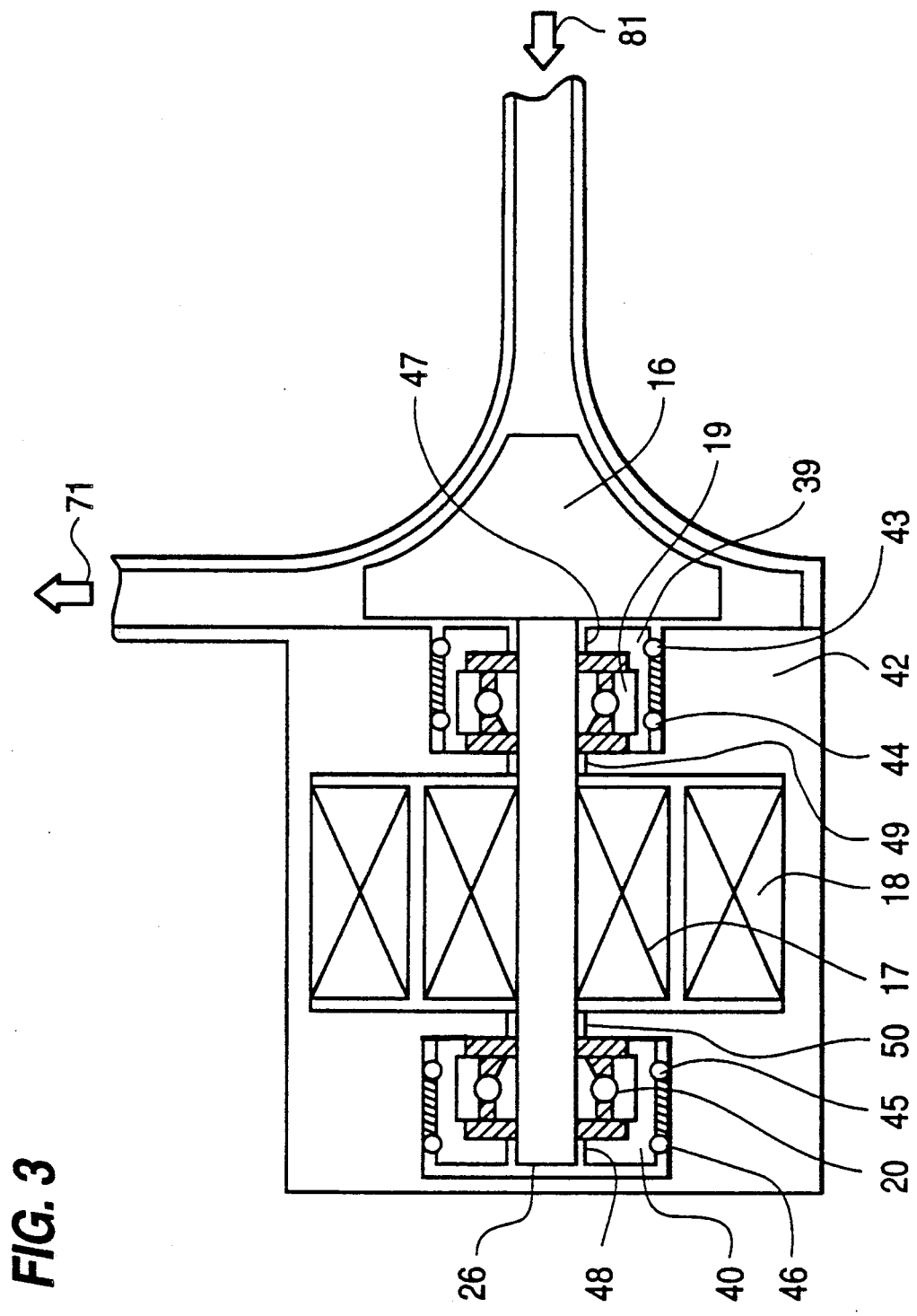
FIG. 3 is a side, partial cross-sectional view showing the construction of a turbo blower for a laser device according to still another embodiment of the present invention.
Figure 4:
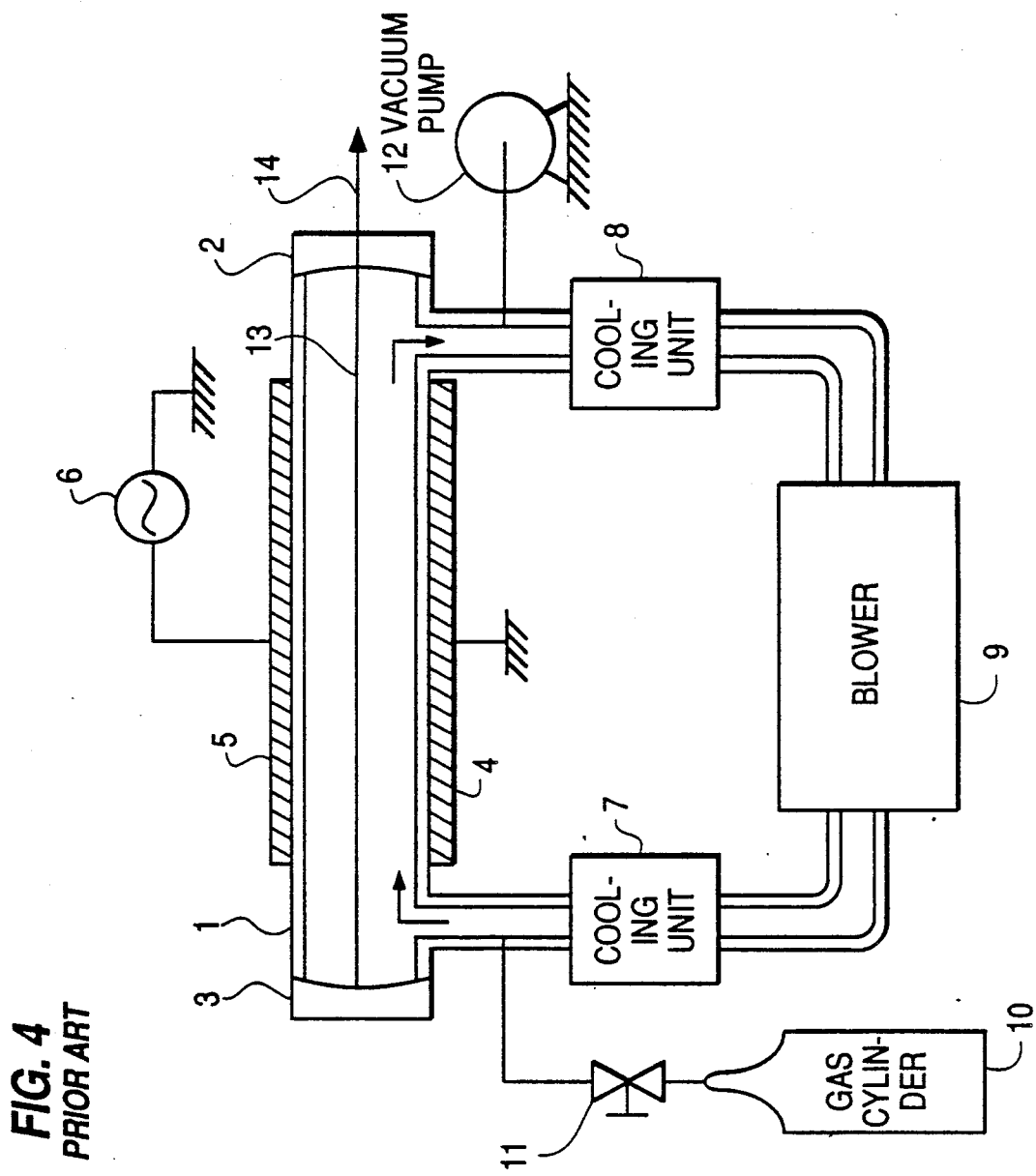
FIG. 4 is a side, partial cross-sectional view showing the general arrangement of a conventional carbon dioxide ($CO_2$) gas laser oscillator device.

Referring to FIG. 3, another embodiment of the present invention will be described. In the present embodiment, an oil film damper is mounted around the bearings of the turbo blower, whereby vibration of the bearings is absorbed. The oil film damper is composed of sleeves 39 and 40, oil filled between a housing 42 and the sleeves 39 and 40, and O-rings 43, 44, 45 and 46. The respective inner races of the rolling-contact bearings 19 and 20 are fixed to a shaft 26, and the outer races are fixed to the sleeves 39 and 40, respectively. A gap of 10 to 100 μm, formed between the housing 42 and the sleeves 39 and 40, is filled with grease or oil. The O-rings 43, 44, 45 and 46 serve to block the ingress of the grease or oil filling the gap into the laser gas. The sleeves 39 and 40 are provided with non-contact seal portions 47 and 48, respectively, which are similar to those shown in FIG. 1, and further, non-contact seal portions 49 and 50 are arranged on a part of the housing 42. With this arrangement, vibration produced when an impeller 16 and the shaft 26 rotate is damped by a hydrodynamic damping effect of the oil film damper, and the grease is prevented from flowing out of spaces on either side of the bearings by the non-contact seal portions 47, 48, 49 and 50. These non-contact seal portions alternatively may be provided on either side of the sleeves 39 and 40.

Although rolling-contact bearings have been described in connection with the aforementioned embodiments, they may be replaced with ball bearings or roller bearings. Further, ceramic bearings formed of a ceramic material may be used for this purpose.

The non-contact seal portions of the present embodiment may be composed of labyrinth seals since, although the labyrinth seals are complicated in construction, they are an efficient means of grease sealing.

According to the present invention, as described above, the bearings of the blower are of a grease-lubrication type such that the spaces on either side of the bearings are filled with grease, and thus a periodical inspection and replacement of the grease or a replacement of the bearings is not required. Moreover, it is unnecessary to control the amount of sealed grease at the time of grease filling. Accordingly, a turbo blower having an improved reliability and maintenance efficiency can be provided for a laser device.

Furthermore, a supply unit is not required, and accordingly, the cost of the device is reduced.

We claim:

1. A turbo blower for a leer device, comprising:
a shaft having an impeller on one end thereof;
bearings supporting said shaft, each of said bearings including first spaces for receiving lubricant;
a motor mounted in said blower adjacent and connected to said shaft for rotating said shaft;
second spaces for retaining lubricant formed on either side of said bearings
non-contact seal portions provided for preventing said lubricant from flowing out of said second spaces; and
said first spaces and second spaces being filled with said lubricant.

2. A turbo blower for a laser device according to claim 1, wherein the direction of the axis of rotation of said shaft is parallel to the ground.

3. A turbo blower for a laser device according to claim 1, wherein said shaft is provided with two impellers so that a reverse thrust load is applied to the shaft.

4. A turbo blower for a laser device according to claim 1, wherein said bearings are provided with an oil film damper.

5. A turbo blower for a laser device according to claim 1, wherein said bearings are ball bearings.

6. A turbo blower for a laser device according to claim 1, wherein said bearings are roller bearings.

7. A turbo blower for a laser device according to claim 1, wherein said bearings are ceramic bearings.

8. A laser oscillator device, comprising:
a discharge tube for effecting laser excitation by a gas discharge;
an optical resonator for laser oscillation;
a gas circulating device for forced cooling of a laser gas by a turbo blower and a cooling unit;
said turbo blower including:
a shaft having an impeller on one end thereof;
bearings supporting said shaft, each of said bearings including first spaces for receiving lubricant;
a motor mounted in said blower adjacent and connected to said shaft for rotating said shaft;
second spaces for retaining lubricant formed on either side of said bearings,
non-contact seal portions provided for preventing said lubricant from flowing out of said second spaces; and
said first spaces and second spaces being filled with said lubricant.

9. A laser oscillator device according to claim 8, wherein said laser excitation is caused by a high-frequency gas discharge.

10. The oscillator according to claim 8, wherein the direction of the axis of rotation of said shaft is parallel to the ground.

11. The oscillator according to claim 8, wherein said shaft is provided with two impellers so that a reverse thrust load is applied to the shaft.

12. The oscillator according to claim 8, wherein said bearings are provided with an oil film damper.

13. The oscillator according to claim 8, wherein said bearings are ball bearings.

14. The oscillator according to claim 8, wherein said bearings are roller bearings.

15. The oscillator according to claim 8, wherein said bearings are ceramic bearings.

16. A turbo blower for a leer device according to claim 1, wherein the impeller is selected from the group comprising a centrifugal impeller, a mixed flow impeller and an axial flow impeller.

17. A laser oscillator according to claim 8, wherein the impeller is selected from the group comprising a centrifugal impeller, a mixed flow impeller and an axial flow impeller 18. A turbo blower for a leer device according to claim 1, wherein said bearings are rolling-contact bearings.

19. A laser oscillator according to claim 8, wherein said bearings are rolling-contact bearings.

20. A turbo blower for a laser device according to claim 1, wherein said non-contact seal portions are labyrinth seals.

21. A laser oscillator according to claim 8, wherein the non-contact seal portions are labyrinth seals.

* * * * *

UNITED STATES PATENT AND TRADEMARK OFFICE
CERTIFICATE OF CORRECTION

PATENT NO. : 5,124,997
DATED : June 23, 1992
INVENTOR(S) : TSUTOMU FUNAKUBO and NORIO KARUBE It is certified that error appears in the above-identified patent and that said Letters Patent is hereby corrected as shown below:

Column 5, line 58, "leer" should be --laser--.

Column 6, line 51, "leer" should be --laser--.

Signed and Sealed this

Twelfth Day of October, 1993

Attest:

BRUCE LEHMAN

Attesting Officer    Commissioner of Patents and Trademarks